United States Patent
Mattila

(10) Patent No.: US 10,514,699 B2
(45) Date of Patent: *Dec. 24, 2019

(54) APPARATUS, METHOD AND COMPUTER PROGRAM FOR ENABLING CHARGING OF A VEHICLE

(71) Applicant: Nokia Technologies Oy, Espoo (FI)

(72) Inventor: Ville-Veikko Mattila, Tampere (FI)

(73) Assignee: Nokia Technologies Oy, Espoo (FI)

( * ) Notice: Subject to any disclaimer, the term of this patent is extended or adjusted under 35 U.S.C. 154(b) by 53 days.

This patent is subject to a terminal disclaimer.

(21) Appl. No.: 15/868,750

(22) Filed: Jan. 11, 2018

(65) Prior Publication Data

US 2018/0136663 A1 May 17, 2018

Related U.S. Application Data

(63) Continuation of application No. 15/115,246, filed as application No. PCT/FI2014/051058 on Dec. 30, 2014, now Pat. No. 9,904,288.

(30) Foreign Application Priority Data

Jan. 31, 2014 (GB) .................................. 1401650.5

(51) Int. Cl.
*G05D 1/02* (2006.01)
*B60L 8/00* (2006.01)
(Continued)

(52) U.S. Cl.
CPC ............ *G05D 1/0217* (2013.01); *B60L 8/003* (2013.01); *B60L 53/00* (2019.02); *B60L 53/35* (2019.02);
(Continued)

(58) Field of Classification Search
CPC ...... B60L 8/003; B60L 1/003; B60L 11/1844; H02J 7/0073; H02J 7/00; H01L 31/02021;
(Continued)

(56) References Cited

U.S. PATENT DOCUMENTS

| 8,576,665 B2 * | 11/2013 | Jiang | G01K 1/024 367/131 |
| 2008/0149403 A1 * | 6/2008 | Fein | B60K 16/00 180/2.2 |

(Continued)

FOREIGN PATENT DOCUMENTS

| JP | 2010281715 A | 12/2010 |
| JP | 2011242305 A | 12/2011 |
| WO | WO-2011010392 A1 | 1/2011 |

*Primary Examiner* — Yuri Kan
(74) *Attorney, Agent, or Firm* — Mintz Levin Cohn Ferris Glovsky and Popeo, P.C.

(57) ABSTRACT

An apparatus (1), method and computer program wherein the apparatus (1) comprises: processing circuitry (5); and memory circuitry (7) including computer program code (11); the memory circuitry (7) and the computer program code (11) configured to, with the processing circuitry (7), cause the apparatus (1) at least to perform: obtaining information from a solar powered vehicle (31) wherein the information comprises at least a current location of the solar powered vehicle (31); obtaining information (25) relating to distribution of solar power in a predetermined area; using the obtained information to determine a solar power charging strategy (27); and enabling the solar powered vehicle (31) to access the solar power charging strategy (27).

20 Claims, 7 Drawing Sheets

Figure 1:
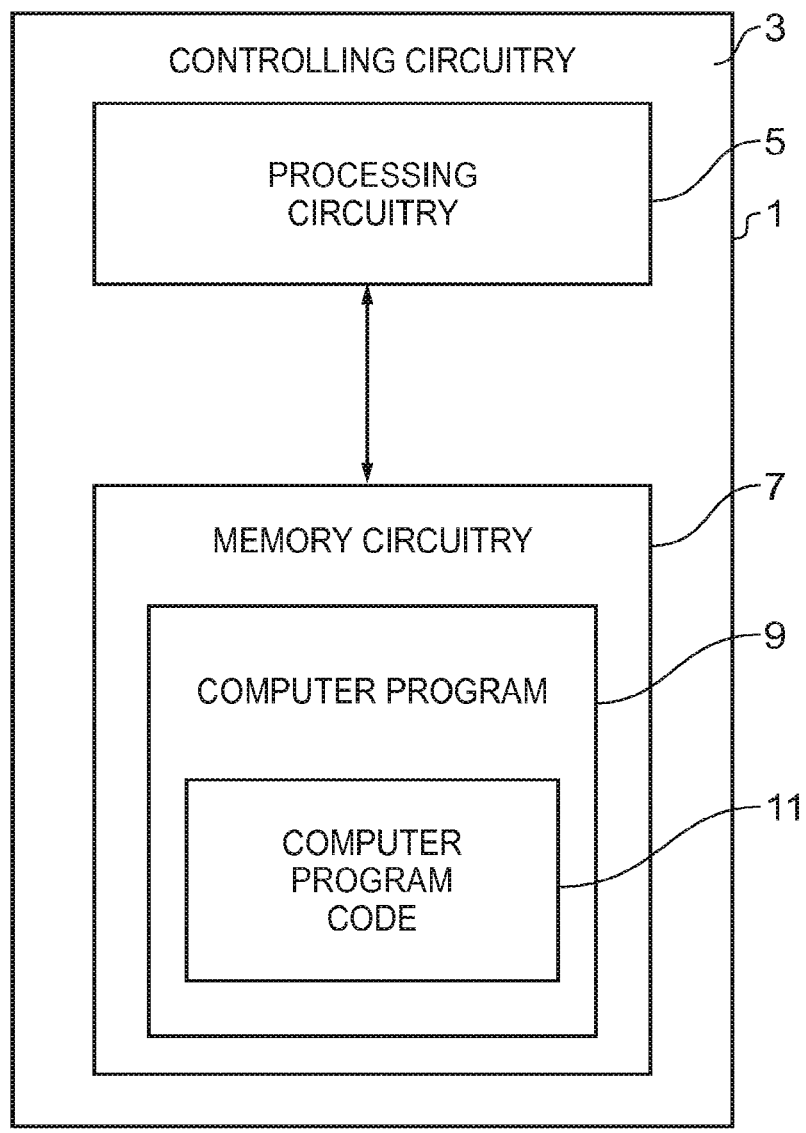

(51) Int. Cl.
*H02J 7/00* (2006.01)
*H02J 7/35* (2006.01)
*H02J 13/00* (2006.01)
*B60L 53/00* (2019.01)
*B60L 53/35* (2019.01)
*B60L 53/36* (2019.01)
*B60L 53/60* (2019.01)

(52) U.S. Cl.
CPC ............... *B60L 53/36* (2019.02); *B60L 53/60* (2019.02); *H02J 7/00* (2013.01); *H02J 7/35* (2013.01); *H02J 13/00* (2013.01); *B60L 2240/62* (2013.01); *B60L 2240/622* (2013.01); *B60L 2240/665* (2013.01); *B60L 2240/70* (2013.01); *B60L 2250/12* (2013.01); *B60L 2260/32* (2013.01); *B60L 2260/54* (2013.01); *Y02T 10/7005* (2013.01); *Y02T 10/7072* (2013.01); *Y02T 10/7083* (2013.01); *Y02T 10/7094* (2013.01); *Y02T 10/7291* (2013.01); *Y02T 90/121* (2013.01); *Y02T 90/125* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y04S 30/12* (2013.01)

(58) Field of Classification Search
CPC ...... H01L 31/042; B60K 16/00; G08G 1/143; G08G 1/14; G06Q 50/06; G05D 1/0274; G05D 1/02; G01K 1/024
See application file for complete search history.

(56) References Cited

U.S. PATENT DOCUMENTS

| | | | | |
|---|---|---|---|---|
| 2010/0030417 | A1* | 2/2010 | Fang | G05D 1/0274 701/25 |
| 2011/0191266 | A1* | 8/2011 | Matsuyama | G06Q 50/06 705/412 |
| 2011/0202221 | A1 | 8/2011 | Sobue et al. | |
| 2011/0313647 | A1 | 12/2011 | Koebler et al. | |
| 2012/0158229 | A1 | 6/2012 | Schaefer | |
| 2012/0259723 | A1* | 10/2012 | Ansari | B60L 11/1844 705/26.3 |
| 2012/0262104 | A1* | 10/2012 | Kirsch | H02J 7/0073 320/101 |
| 2012/0286052 | A1 | 11/2012 | Atluri et al. | |
| 2013/0046457 | A1 | 2/2013 | Pettersson | |
| 2013/0061902 | A1* | 3/2013 | Quinn | H01L 31/02021 136/244 |
| 2013/0110330 | A1* | 5/2013 | Atluri | B60L 1/003 701/22 |
| 2013/0285841 | A1* | 10/2013 | Kirsch | G08G 1/143 340/932.2 |
| 2014/0297072 | A1* | 10/2014 | Freeman | B60L 8/003 701/22 |

* cited by examiner

APPARATUS, METHOD AND COMPUTER PROGRAM FOR ENABLING CHARGING OF A VEHICLE

CROSS REFERENCE TO RELATED APPLICATIONS

This application is a continuation of U.S. application Ser. No. 15/115,246, filed on Jul. 28, 2016, which is a national phase filing of International Application No. PCT/FI2014/051058, filed on Dec. 30, 2014, which claims priority to Great Britain Application No. 1401650.5, filed on Jan. 31, 2014, the disclosures of which are incorporated herein by reference in their entirety.

TECHNOLOGICAL FIELD

Examples of the present disclosure relate to an apparatus, method and computer program for enabling charging of a vehicle. In particular, they relate to an apparatus, method and computer program for enabling charging of a solar powered vehicle.

BACKGROUND

Electric vehicles, such as cars, are known. A solar powered electric vehicle may comprise photovoltaic cells which may be configured to convert incident sunlight into electrical power.

Solar powered electric vehicles may be charged by positioning the vehicle in a location in which sufficient amounts of solar power are incident on the photovoltaic cells. It is useful to ensure that such vehicles can obtain sufficient amounts of power.

BRIEF SUMMARY

According to various, but not necessarily all, examples of the disclosure there may be provided an apparatus comprising: processing circuitry; and memory circuitry including computer program code; the memory circuitry and the computer program code configured to, with the processing circuitry, cause the apparatus at least to perform: obtaining information from a solar powered vehicle wherein the information comprises at least a current location of the solar powered vehicle; obtaining information relating to distribution of solar power in a predetermined area; using the obtained information to determine a solar power charging strategy; and enabling the solar powered vehicle to access the solar power charging strategy.

In some examples the information obtained from the solar powered vehicle may comprise information relating to power requirements for the solar powered vehicle.

In some examples the information relating to power requirements may comprise information indicative of current stored power levels.

In some examples the information relating to power requirements may comprise information relating to expected power usage.

In some examples information may be obtained from a plurality of solar powered vehicles.

In some examples the information relating to the distribution of solar power may comprise at least one of time of day, weather conditions, heights of buildings, positions of shadows, ambient light levels.

In some examples the predetermined area may comprise the current location of the solar powered vehicle.

In some examples the predetermined area might not comprise the current location of the solar powered vehicle.

In some examples the charging strategy may comprise autonomously moving a solar powered vehicle. The charging strategy may comprise a schedule of when a solar powered vehicle should move to a charging location. The charging strategy may comprise a schedule of when a solar powered vehicle should leave a charging location.

In some examples the charging strategy may be determined for a plurality of vehicles.

In some examples the apparatus may enable a plurality of vehicles to access the charging strategy.

In some examples the memory circuitry and the computer program code may be configured to, with the processing circuitry, cause the apparatus to obtain further information and modify the charging strategy to incorporate the further information.

According to various, but not necessarily all, examples of the disclosure there may be provided a server comprising an apparatus as described above wherein the server is configured to communicate with a solar powered vehicle.

According to various, but not necessarily all, examples of the disclosure there may be provided a method comprising: obtaining information from a solar powered vehicle wherein the information comprises at least a current location of the solar powered vehicle; obtaining information relating to distribution of solar power in a predetermined area; using the obtained information to determine a solar power charging strategy; and enabling the solar powered vehicle to access the solar power charging strategy.

In some examples the information obtained from the solar powered vehicle may comprise information relating to power requirements for the solar powered vehicle.

In some examples the information relating to power requirements may comprise information indicative of current stored power levels.

In some examples the information relating to power requirements may comprise information relating to expected power usage.

In some examples the method may further comprise obtaining information from a plurality of solar powered vehicles.

In some examples the information relating to the distribution of solar power may comprise at least one of time of day, weather conditions, heights of buildings, positions of shadows, ambient light levels.

In some examples the predetermined area may comprise the current location of the solar powered vehicle.

In some examples the predetermined area might not comprise the current location of the solar powered vehicle.

In some examples the charging strategy may comprise autonomously moving a solar powered vehicle. The charging strategy may comprise a schedule of when a solar powered vehicle should move to a charging location. The charging strategy may comprise a schedule of when a solar powered vehicle should leave a charging location.

In some examples the charging strategy may be determined for a plurality of vehicles.

In some examples the method may comprise enabling a plurality of vehicles to access the charging strategy.

In some examples the method may comprise obtaining further information and modifying the charging strategy to incorporate the further information.

According to various, but not necessarily all, examples of the disclosure there may be provided a computer program comprising computer program instructions that, when executed by processing circuitry, enable: obtaining information from a solar powered vehicle wherein the information comprises at least a current location of the solar powered vehicle; obtaining information relating to distribution of solar power in a predetermined area; using the obtained information to determine a solar power charging strategy; and enabling the solar powered vehicle to access the solar power charging strategy.

According to various, but not necessarily all, examples of the disclosure there may be provided a computer program comprising program instructions for causing a computer to perform the methods described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there may be provided an apparatus comprising: processing circuitry; and memory circuitry including computer program code; the memory circuitry and the computer program code configured to, with the processing circuitry, cause the apparatus at least to perform: providing information comprising a current location of a solar powered vehicle; obtaining a solar power charging strategy wherein the solar power charging strategy is determined using the information comprising a current location and information relating to distribution of solar power in a predetermined area; and using the solar power charging strategy to control the location of the solar powered vehicle.

In some examples the information provided may comprise information relating to power requirements for the solar powered vehicle.

In some examples the information relating to power requirements may comprise information indicative of current stored power levels.

In some examples the information relating to power requirements may comprise information relating to expected power usage.

In some examples the information may be provided to a remote server.

In some examples the solar power charging strategy may be obtained from a remote server.

According to various, but not necessarily all, examples of the disclosure there may be provided a solar powered vehicle comprising an apparatus as described above.

According to various, but not necessarily all, examples of the disclosure there may be provided a method comprising: providing information comprising a current location of a solar powered vehicle; obtaining a solar power charging strategy wherein the solar power charging strategy is determined using the information comprising a current location and information relating to distribution of solar power in a predetermined area; and using the solar power charging strategy to control the location of the solar powered vehicle.

In some examples the information provided may comprise information relating to power requirements for the solar powered vehicle.

In some examples the information relating to power requirements may comprise information indicative of current stored power levels.

In some examples the information relating to power requirements may comprise information relating to expected power usage.

In some examples the information may be provided to a remote server.

In some examples the solar power charging strategy may be obtained from a remote server.

According to various, but not necessarily all, examples of the disclosure there may be provided a computer program comprising computer program instructions that, when executed by processing circuitry, enable: providing information comprising a current location of a solar powered vehicle; obtaining a solar power charging strategy wherein the solar power charging strategy is determined using the information comprising a current location and information relating to distribution of solar power in a predetermined area; and using the solar power charging strategy to control the location of the solar powered vehicle.

According to various, but not necessarily all, examples of the disclosure there may be provided a computer program comprising program instructions for causing a computer to perform the method as described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

According to various, but not necessarily all, examples of the disclosure there is provided examples as claimed in the appended claims.

BRIEF DESCRIPTION

Figure 2:
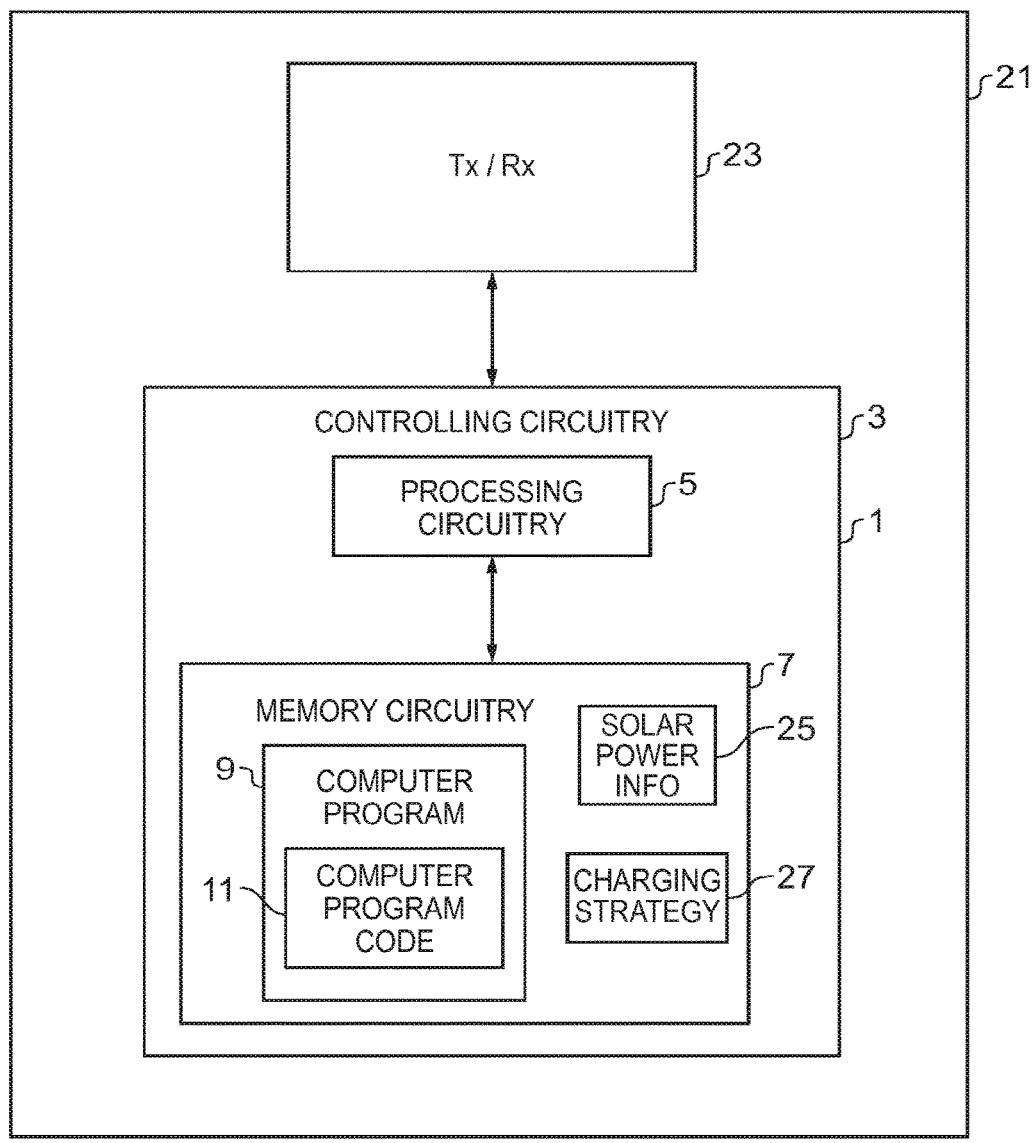
Figure 3:
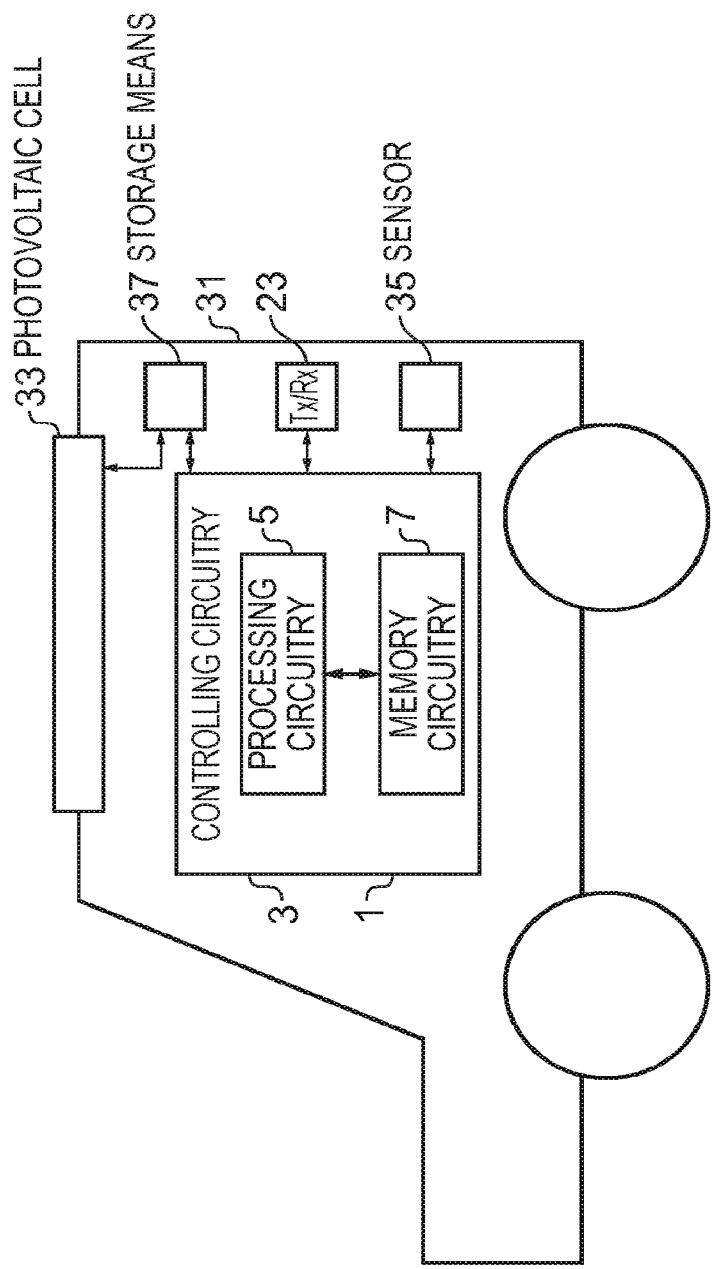
Figure 4:
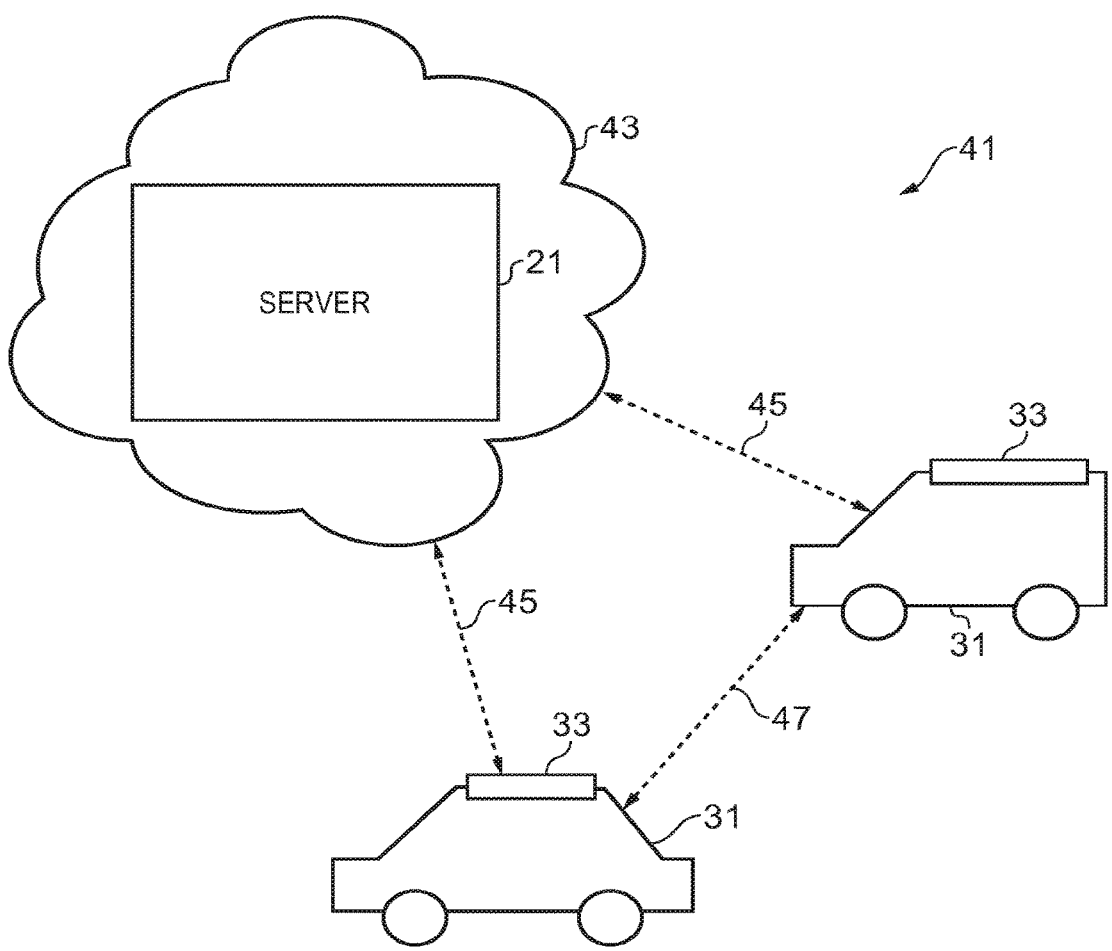
Figure 5:
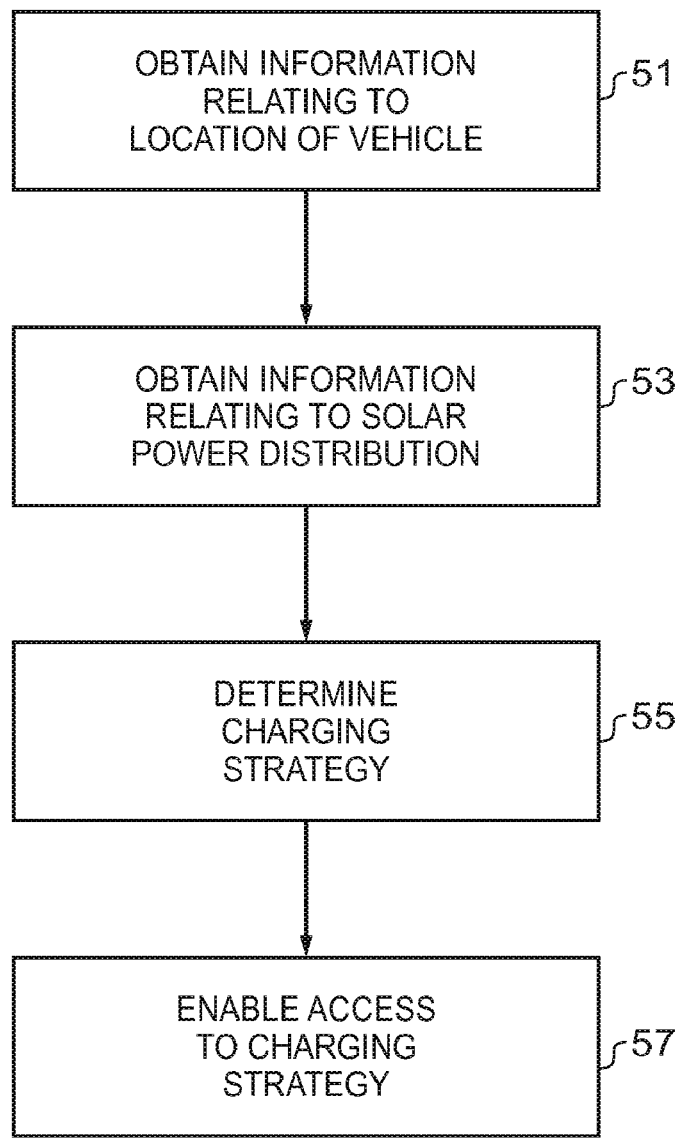
Figure 6:
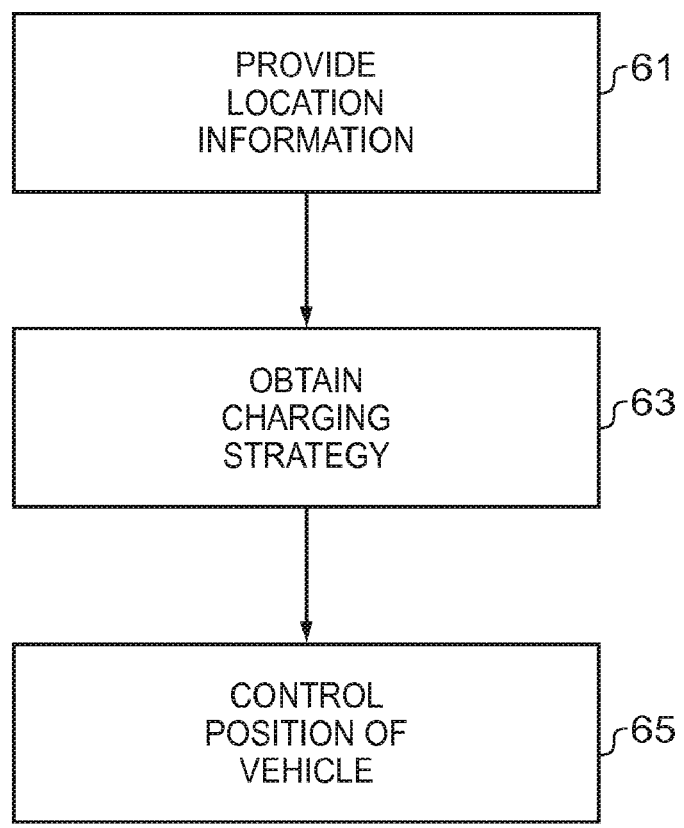
Figure 7:
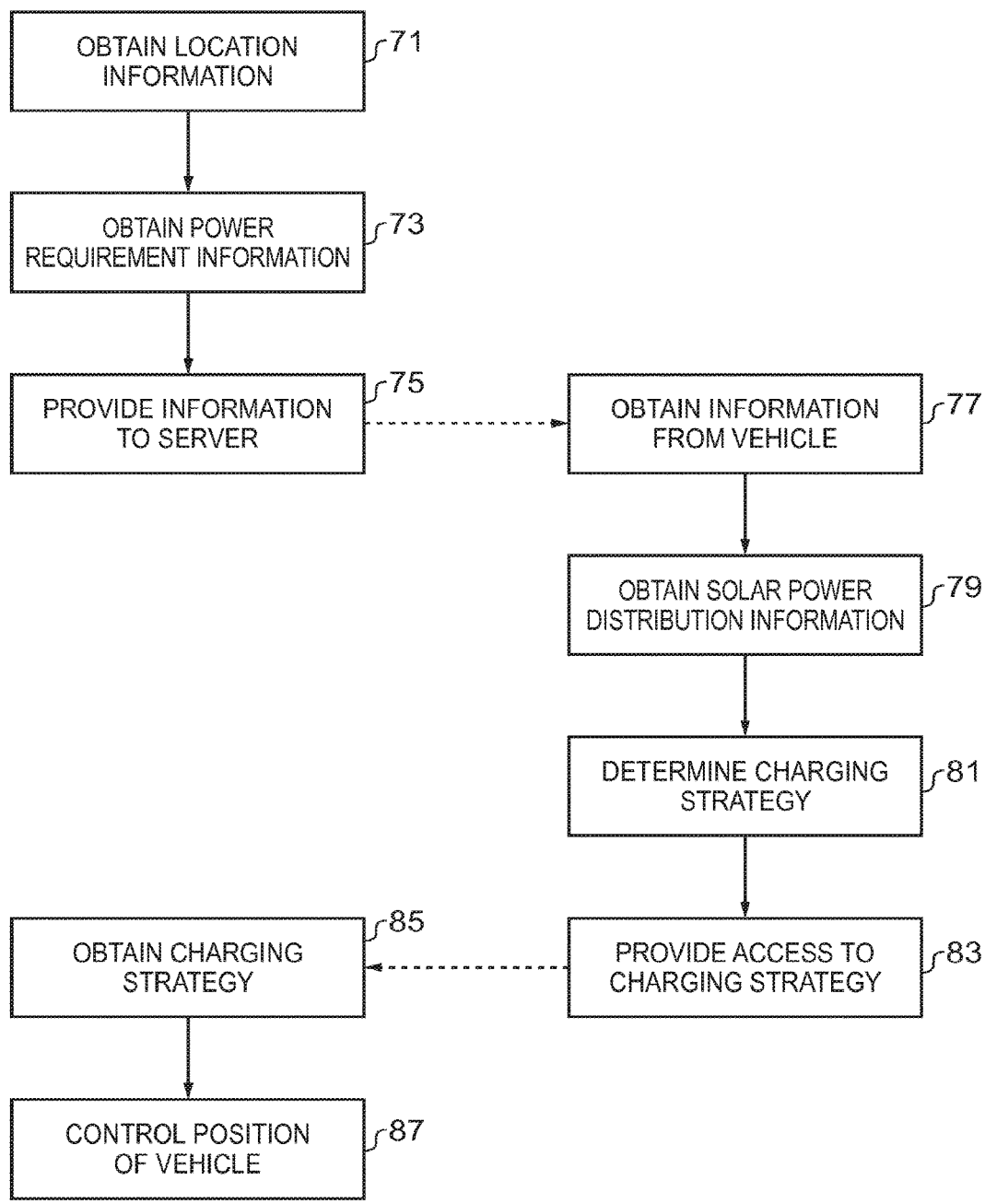

For a better understanding of various examples that are useful for understanding the detailed description, reference will now be made by way of example only to the accompanying drawings in which:

FIG. 1 illustrates an apparatus;
FIG. 2 illustrates a server comprising an apparatus;
FIG. 3 illustrates a vehicle comprising an apparatus;
FIG. 4 illustrates a system comprising an apparatus;
FIG. 5 illustrates a method;
FIG. 6 illustrates a method; and
FIG. 7 illustrates a method.

DETAILED DESCRIPTION

The Figures illustrate an apparatus 1 comprising: processing circuitry 5; and memory circuitry 7 including computer program code 11; the memory circuitry 7 and the computer program code 11 configured to, with the processing circuitry 5, cause the apparatus 1 at least to perform: obtaining information from a solar powered vehicle 31 wherein the information comprises at least a current location of the solar powered vehicle 31; obtaining information 25 relating to the distribution of solar power in a predetermined area; using the obtained information 25 to determine a solar power charging strategy 27; and enabling the solar powered vehicle 31 to access the solar power charging strategy 27.

The Figures also illustrate an apparatus 1 comprising processing circuitry 5; and memory circuitry 7 including computer program code 11; the memory circuitry 7 and the computer program code 11 configured to, with the processing circuitry 5, cause the apparatus 1 at least to perform: providing information comprising a current location of a solar powered vehicle 31; obtaining a solar power charging strategy 27 wherein the solar power charging strategy 27 is determined using the information comprising a current location and information 25 relating to the distribution of solar power in a predetermined area; and using the solar power charging strategy 27 to control the location of the solar powered vehicle 31.

Examples of the disclosure provide apparatus, methods and computer programs for enabling solar powered vehicles 31 to be charged efficiently. In some examples the disclosure may enable central control of the position of a plurality of solar powered vehicles 31 to ensure that each solar powered vehicle 31 obtains sufficient power.

FIG. 1 schematically illustrates an example apparatus 1 which may be used in implementations of the disclosure. The apparatus 1 illustrated in FIG. 1 may be a chip or a chip-set. The apparatus 1 may be provided within a device such as a server which may be configured to communicate with a solar powered vehicle. In some examples the apparatus 1 may be provided within a solar powered vehicle which may be configured to communicate with a server and/or other vehicles.

The example apparatus 1 comprises controlling circuitry 3. The controlling circuitry 3 may provide means for determining a solar power charging strategy 27 for one or more solar powered vehicles 31. The controlling circuitry 3 may comprise one or more controllers. The controlling circuitry 3 may be implemented using instructions that enable hardware functionality, for example, by using executable computer program instructions in a general-purpose or special-purpose processing circuitry 5 that may be stored on a computer readable storage medium (disk, memory, memory circuitry 7 etc) to be executed by such processing circuitry 5.

The processing circuitry 5 may be configured to read from and write to memory circuitry 7. The processing circuitry 5 may comprise one or more processors. The processing circuitry 5 may also comprise an output interface via which data and/or commands are output by the processing circuitry 5 and an input interface via which data and/or commands are input to the processing circuitry 5.

The memory circuitry 7 may be configured to store a computer program 9 comprising computer program instructions (computer program code 11) that controls the operation of the apparatus 1 when loaded into processing circuitry 5. The computer program instructions, of the computer program 9, provide the logic and routines that enable the apparatus 1 to perform the example methods illustrated in FIGS. 5 to 7. The processing circuitry 5 by reading the memory circuitry 7 is able to load and execute the computer program 9.

The apparatus 1 therefore comprises: processing circuitry 5; and memory circuitry 7 including computer program code 11, the memory circuitry 7 and the computer program code 11 configured to, with the processing circuitry 5, cause the apparatus 1 at least to perform: obtaining information from a solar powered vehicle 31 wherein the information comprises at least a current location of the solar powered vehicle 31; obtaining information 25 relating to the distribution of solar power in a predetermined area; using the obtained information 25 to determine a solar power charging strategy 27; and enabling the solar powered vehicle 31 to access the solar power charging strategy 27.

Alternative apparatus 1 may comprise: processing circuitry 5; and memory circuitry 7 including computer program code 11, the memory circuitry 7 and the computer program code 11 configured to, with the processing circuitry 5, cause the apparatus 1 at least to perform: providing information comprising a current location of a solar powered vehicle 31; obtaining a solar power charging strategy 27 wherein the solar power charging strategy 27 is determined using the information comprising a current location and information 25 relating to the distribution of solar power in a predetermined area; and using the solar power charging strategy 27 to control the location of the solar powered vehicle 31.

The computer program 9 may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), or an article of manufacture that tangibly embodies the computer program. The delivery mechanism may be a signal configured to reliably transfer the computer program 9. The apparatus may propagate or transmit the computer program 9 as a computer data signal.

Although the memory circuitry 7 is illustrated as a single component in the figures it is to be appreciated that it may be implemented as one or more separate components some or all of which may be integrated/removable and/or may provide permanent/semi-permanent/dynamic/cached storage.

Although the processing circuitry 5 is illustrated as a single component in the figures it is to be appreciated that it may be implemented as one or more separate components some or all of which may be integrated/removable.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application-specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 2 schematically illustrates a server 21. The server 21 may comprise an apparatus 1 and a transceiver 23. It is to be appreciated that only features necessary for the following description have been illustrated in FIG. 2.

The apparatus 1 comprised within the server of FIG. 2 may be as illustrated in FIG. 1 and described above. Corresponding reference numerals are used for corresponding features.

As described above the apparatus 1 comprises controlling circuitry 3. The controlling circuitry 3 comprises memory circuitry 7 and processing circuitry 5. The memory circuitry 7 may be configured to store a computer program 9 comprising computer program code 11. The memory circuitry 7 may also be configured to store information 25 relating to solar power distribution. For instance, the memory circuitry 7 may be configured to store information representing a three dimensional model of a plurality of towns and cities. The three dimensional model may then be used to calculate the positions of shadows for a given time of year and/or day.

The memory circuitry 7 may also be configured to store information relating to a solar power charging strategy 27. The solar power charging strategy 27 may comprise information which may be used by one or more solar powered vehicles to enable the solar powered vehicles to obtain sufficient solar power. The solar power charging strategy 27 may be determined by the processing circuitry 5 of the server 21. The processing circuitry 5 may use the information 25 relating to solar power distribution to determine the solar power charging strategy 27.

The transceiver 23 may comprise one or more transmitters and/or receivers. The transceiver 23 may comprise any means which enables the server 21 to establish a communication connection with a remote apparatus and exchange information with the remote apparatus. The remote apparatus may be located in a vehicle and/or another server. The communication connection may comprise a wireless connection.

In some examples the transceiver 23 may enable the server 21 to connect to a network such as a cellular network. In some examples the transceiver 23 may enable the apparatus 1 to communicate in local area networks such as wireless local area networks, Bluetooth networks or any other suitable network.

The transceiver 23 may be configured to provide information obtained via the transceiver 23 to the controlling circuitry 3. The transceiver 23 may also be configured to enable information from the controlling circuitry 3, such as the solar power charging strategy 27, to be transmitted via the transceiver 23.

FIG. 3 schematically illustrates a solar powered vehicle 31. The solar powered vehicle 31 may be a car or a van or any other suitable type of vehicle.

The solar powered vehicle 31 may comprise an apparatus 1, one or more photovoltaic cells 33, storage means 37, one or more sensors 35 and a transceiver 23. It is to be appreciated that only features necessary for the following description have been illustrated in FIG. 3.

The apparatus 1 of FIG. 3 may be as illustrated in FIG. 1 and described above. Corresponding reference numerals are used for corresponding features.

As described above the apparatus 1 comprises controlling circuitry 3. The controlling circuitry 3 comprises memory circuitry 7 and processing circuitry 5. The memory circuitry 7 may be configured to store a computer program 9 comprising computer program code 11.

The controlling circuitry 3 may be configured to enable autonomous control of the vehicle 31. The autonomous control of the vehicle 31 may enable the vehicle 31 to be moved without direct control inputs from a user.

The transceiver 23 may comprise one or more transmitters and/or receivers. The transceiver 23 may comprise any means which enables the solar powered vehicle 31 to establish a communication connection with a remote apparatus and exchange information with the remote apparatus. The remote apparatus may be located in another vehicle and/or a server. The communication connection may comprise a wireless connection.

In some examples the transceiver 23 may enable the solar powered vehicle 31 to connect to a network such as a cellular network. In some examples the transceiver 23 may enable the solar powered vehicle 31 to communicate in local area networks such as wireless local area networks, Bluetooth networks or any other suitable network.

The transceiver 23 may be configured to provide information obtained via the transceiver 23 to the controlling circuitry 3. The transceiver 23 may also be configured to enable information from the controlling circuitry 3 to be transmitted via the transceiver 23.

The one or more photovoltaic cells 33 may comprise any means which may be configured to convert solar energy into electrical power. In some examples the photovoltaic cells 33 may comprise one or more panels comprising photovoltaic semiconductors. The photovoltaic semiconductors may be configured to create an electric current from incident solar power.

The storage means 37 may comprise any means which may be configured to store electrical energy. The electrical energy which is stored by the storage means 37 may comprise energy which is obtained from the photovoltaic cells 33. In some examples the storage means 37 may comprise a battery which may be charged by the photovoltaic cells 33.

The storage means 37 may be connected to the photovoltaic cells 33 so that electrical energy can be transferred from the photovoltaic cells 33 to the storage means 37.

The example vehicle 31 of FIG. 3 also comprises one or more sensors 35. The sensors 35 may comprise any means which may be configured to detect a physical parameter and provide an electrical signal indicative of the physical parameter.

The sensors 35 may enable information relating to the vehicle 31 to be obtained. The information which is obtained may comprise information relating to the current location of the vehicle 31. For example the one or more sensors 35 may comprise positioning sensors such as global positioning system (GPS) sensors or any other type of positioning sensors.

In some examples the information which is obtained by the sensors 35 may comprise information relating to power requirements for the solar powered vehicle 31. For example the sensors 35 may obtain information relating to the current stored power levels in the storage means 37 or the expected power requirements of the vehicle 31.

The sensors 35 may be configured to provide the information obtained by the sensors 35 to the controlling circuitry 3. The controlling circuitry 3 may store the obtained information in the memory circuitry 7. In some examples the information obtained by the sensor 35 may be transmitted via the transceiver 23.

In some examples the one or more sensors 35 may be configured to obtain information which may be used to enable autonomous control of the vehicle 31. In such examples the sensors 35 could be configured to detect the distance between the vehicle 31 and other objects around the vehicle 31. This may enable the vehicle 31 to be moved without touching the other objects.

FIG. 4 illustrates a system 41 comprising a server 21 and one or more vehicles 31. The server 21 may be as described above in relation to FIG. 2. The one or more vehicles may be as described above in relation to FIG. 3.

The server 21 may be located remotely from the one or more vehicles 31. The server 21 may be located within a communications network 43 which may be accessed by the one or more vehicles 31.

The server 21 and vehicles 31 may be configured to enable communication links 45 to be established between the server 21 and the vehicles 31. The communication links 45 may comprise wireless communication links 45. The wireless communication links 45 may be part of a communications network 43 such as a cellular communications network 43 or a local area network.

The communications links 45 may comprise any means which may enable information to be exchanged between the server 21 and the one or more vehicles 31. This may enable the vehicles 31 to provide information to the server 21. The information which is provided from the vehicles 31 to the server 21 may comprise information which is obtained using one or more sensors 35. The information which is provided from the vehicles 31 to the server 21 may comprise information indicating a current location of the vehicle 31 and/or information relating to power requirements for the vehicle 31.

The communication links 45 may also enable the server 21 to provide information to the vehicles 31. The information which is provided from the server 21 to the vehicles 31 may include information relating to the solar power charging strategy 27.

In the example system 41 of FIG. 4 the vehicles 31 are also configured to enable a communication link 47 to be established between two vehicles 31. The communication link 47 may comprise any means which may enable information to be exchanged between the two vehicles 31. The communication link 47 may comprise a wireless communication link 47. The communication link 47 may be part of a network such as a local area network. The communication link 47 may enable the vehicles 31 to coordinate implementation of a solar power charging strategy 27.

FIGS. 5 to 7 are block diagrams which schematically illustrate example methods. The methods of FIGS. 5 to 7 may be implemented using the example apparatus 1, server 21, vehicles 31 and system 41 of FIGS. 1 to 4 and as described above.

The method of FIG. 5 may be implemented by a server 21 such as the example server 21 of FIG. 2. The server 21 may be configured to communicate with one or more remote vehicles 31. The example method of FIG. 5 comprises, at block 51, obtaining information from a solar powered vehicle 31. The information which is obtained may comprise at least a current location of the solar powered vehicle 31.

The method also comprises, at block 53, obtaining information 25 relating to the distribution of solar power in a predetermined area.

At block 55 the obtained information is used to determine a solar power charging strategy 27 and at block 57 access to the solar power charging strategy 27 is enabled for the solar powered vehicle 31.

The method of FIG. 6 may be implemented by a solar powered vehicle 31 such as the solar powered vehicles 31 of FIG. 3. The solar powered vehicle 31 may be configured to communicate with a remote server 21 and/or one or more remote vehicles 31. The example method of FIG. 6 comprises, at block 61, providing information comprising a current location of the solar powered vehicle 31.

The method also comprises, at block 63, obtaining a solar power charging strategy 27. The charging strategy 27 may be determined using the information comprising a current location and information 25 relating to the distribution of solar power in a predetermined area.

At block 65 the solar power charging strategy 27 is used to control the location of the solar powered vehicle 31.

The method of FIG. 7 may be implemented by a system 41 such as the system of FIG. 4. Blocks 71, 73, 75, 85 and 87 may be implemented by one or more of the solar powered vehicles 31. Blocks 77 to 83 may be implemented by the server 21. It is to be appreciated that the blocks may be implemented by different apparatus 1 in different examples of the disclosure.

At block 71 a vehicle 31 obtains location information. The location information may comprise the current location of the vehicle 31. The location information may be obtained by a sensor 35 such as a positioning sensor. The sensor 35 may comprise a GPS sensor or any other suitable type of sensor.

In some examples the driver of the vehicle 31 could manually input the current location of the vehicle 31. For example when the user parks the vehicle 31 they could indicate where they have parked the vehicle.

At block 73 the vehicle 31 obtains information relating to the power requirements of the solar powered vehicle 31. The information relating to the power requirements may include information indicative of the current stored power levels in the storage means 37 of the vehicle 31. In such examples, one or more sensors 35 may be configured to determine the current stored power levels in the storage means 37.

In some examples the information relating to the power requirements may include information relating to the expected power usage of the vehicle 31. The information relating to the expected power usage may comprise information relating to expected journeys. The information relating to the expected journeys could include the distance of the journey, the expected time taken for the journey, the expected traffic levels for the journey, the expected start time for the journey and any other suitable type of information.

The expected journey may be determined using any suitable means. In some examples the expected journey may be determined based on the monitored behaviour of the driver. For example if the user has driven the vehicle 31 to their place of work then it may be expected that the next journey would be to drive the vehicle 31 back home at the end of the day. In some examples the driver may be able to input information indicating their next journey. For example they may indicate that after work they will drive straight home or they may wish to visit another location, such as the gym or some shops, on the way home.

In some examples the expected journey may be determined based on accessing stored information relating to the driver. For example the driver may have a calendar or diary stored in an accessible location. The next expected journey may be determined based on the appointments listed in the diary or calendar. In some examples the information relating to the driver may be stored in a server 21.

In some examples the information relating to the expected power usage may comprise information relating to the heating requirements of the vehicle. In such examples one or more of the sensors 35 may determine the temperature in the current location of the vehicle. This may then be used to determine how much power is likely to be needed by the heating and/or air conditioning systems of the vehicle 31. In other examples the temperature information may be obtained from information such as a weather forecast.

In some examples the information relating to the power requirements may include information relating to the availability of charging facilities at the next location of the vehicle 31. For example, if the only parking facilities at the next location are inside or underground then it can be determined that there would be no charging facility for a solar powered vehicle 31.

The information obtained at blocks 71 and 73 may be stored in the memory circuitry 7 of the solar powered vehicle 31. At block 75 the obtained information is provided to the server 21. The obtained information may be retrieved from the memory circuitry 7 and transmitted to a remote server 21 via the transceiver 23.

At block 77 the server 21 obtains the information from the solar powered vehicle 31. The information which is obtained may comprise information relating to the current location of the vehicle 31. In some examples the information which is obtained may comprise information relating to power requirements for the solar powered vehicle 31.

At block 79 the server 21 obtains information 25 relating to the distribution of solar power in a predetermined area. The information 25 relating to the solar power distribution may provide an indication of positions which have a level of incident solar power which is above a given threshold. This may enable positions which could be used for charging a solar powered vehicle 31 to be determined.

The predetermined area may comprise the current location of the vehicle 31. In other examples the predetermined area might not comprise the current location of the solar powered vehicle 31. In such examples the predetermined area may be close to the current location of the solar powered vehicle 31 and/or within a predefined distance of the current location of the solar powered vehicle 31.

The predetermined area may comprise any suitable area. In some examples the predetermined area may comprise a town or a city or a part of a town or city. In some examples the predetermined area may comprise a small region such as a street or car park.

The information 25 relating to the solar power distribution may comprise information relating to time of day, weather conditions, heights of buildings, positions of shadows, ambient light levels or any other suitable information.

In some examples the information 25 relating to the solar power distribution may comprise information stored in the memory circuitry 7 of the server 21. For example the memory circuitry 7 may be configured to store information representing a three dimensional model of one or more locations such as towns and cities. The three dimensional model may include information such as the size and shape of buildings and trees and any other objects which may cast shadows over parked vehicles 31. This information may then be used to calculate the positions of shadows for a given time of year and/or day.

In some examples the information 25 relating to the solar power distribution may comprise information which is obtained from one or more other servers 21. For example the information 25 may comprise information such as the weather forecast or the expected times of sunrise or sunset or any other suitable information.

In some examples the information 25 relating to the solar power distribution may comprise information which is obtained from one or more of the solar powered vehicles 31. For example one or more of the sensors 35 on a solar powered vehicle 31 may comprise an ambient light detector. The ambient light detector may comprise any means which may be configured to detect the ambient light levels around the solar powered vehicle 31 and provide a signal indicative of the detected ambient light levels. The ambient light detector may comprise one or more photosensors or any other suitable means which may be configured to convert incident light to an electrical signal. The ambient light detector may enable current information about the light levels and cloud cover at the location of the vehicle 31 to be determined. This information may be provided to the server 21.

At block 81 the server 21 determines the solar power charging strategy 27. The solar power charging strategy 27 may comprise a schedule of positions for one or more solar powered vehicles 31 and instructions for enabling the vehicles 31 to be autonomously moved to the scheduled location at the correct time. The solar power charging strategy 27 may enable a plurality of vehicles 31 to coordinate their positions so as to ensure that all of the vehicles 31 are adequately charged.

The solar power charging strategy 27 may comprise a schedule of when a solar powered vehicle 31 should move to a charging location. The charging location may comprise any location which has enough incident solar power to enable charging of the vehicle 31. The vehicle 31 may be moved autonomously to the charging location. A notification may be provided to the user of the vehicle 31 to provide an indication of the location to which the vehicle 31 has been moved.

In some examples the vehicle 31 may be moved small distances. For example the vehicle 31 may be moved a few metres to move out of the shade and into direct sunlight. In other examples the vehicle may be moved longer distances such as hundreds of meters or further, for example, if the vehicle 31 is parked in a very build up environment it may be necessary to travel a longer distance to find a location which is not in the shade. When determining the solar power charging strategy 27 the energy requirements for moving to and from the charging location may be taken into account.

The solar power charging strategy 27 may comprise a schedule of when a solar powered vehicle 31 should leave a charging location. For example the vehicle 31 may be instructed to leave the charging location and return to its original location in time for the user to start their next expected journey. In other examples the vehicle 31 may be instructed to leave the charging location in order to enable one or more other solar powered vehicles 31 to access the charging location.

In some examples the solar powered vehicle 31 may be scheduled to leave a location if it is no longer obtaining sufficient solar power. It is to be appreciated that the solar power distribution depends on parameters such as the positions of shadows and the current weather conditions which will change over time. Therefore a solar powered vehicle 31 may be scheduled to move from a first position to a second position once the first position stops receiving enough solar power.

In some examples the server 21 may be configured to obtain information relating to the charging speed or solar power obtained in their current location. This could be achieved by obtaining information relating to the stored power levels as a function of time. This information could be used to determine and/or update a charging strategy 27.

At block 83 the server 21 enables the solar powered vehicles 31 to access the charging strategy 27. The server 21 may transmit the solar power charging strategy 27 to one or more of the vehicles 31 via a communication link 45. In some examples the server 21 may transmit the solar power charging strategy 27 to a first vehicle 31. The first vehicle 31 may then be configured to send the solar power charging strategy 27 to other nearby vehicles 31. For example, the first vehicle 31 may be configured to send the solar power charging strategy 27 to other nearby vehicles 31 via a low power communication link 47. This may reduce the power requirements for accessing the solar power charging strategy 27.

At block 85 the one or more solar powered vehicles 31 obtain access to the charging strategy 27. The solar power charging strategy 27 may be received by the transceiver 23 and stored in the memory circuitry 7 of the solar powered vehicle 31.

At block 87 the solar power charging strategy 27 is implemented and the position of the vehicle 31 is controlled in accordance with the instructions within the solar power charging strategy 27.

The blocks illustrated in FIGS. 5 to 7 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

For example, in the method of FIG. 7 the solar powered vehicle 31 obtains the information relating to the expected power requirements of the vehicle 31 and then sends this to the server 21. It is to be appreciated that in other examples this information could be obtained by the server 21 directly. For example, the server 21 may be configured to access calendar and diary information of the user or to access information such as traffic updates. In other examples some of the information may be obtained by the vehicle 31 and some of the information may be obtained by the server 21 directly.

It is to be appreciated that some blocks of the methods may be repeated as necessary. For example if the situation in the location of a vehicle 31 changes then further information may be provided to the server 21. For example, the weather may change unpredictably so that the cloud cover may increase or decrease, new vehicles 31 which may need to be charged may be positioned near the vehicle 31, or other vehicles 31 may be moved from a charging location. In such examples the server 21 may use the further information to modify the charging strategy to incorporate the further information.

In some examples the user of the vehicle 31 may be able to apply constraints to the charging strategy 27. For instance the user may be able to define when and/or where he would like to collect the vehicle 31. In some examples the user may be able to define the locations and/or range which the vehicle 31 is permitted to move during charging.

The above described disclosure provides apparatus, methods and computer programs which enable a plurality of solar powered vehicles 31 to be charged efficiently.

The examples enable a solar power charging strategy 27 to be determined which may incorporate instructions for a plurality of vehicles 31. This may ensure that each of the vehicles 31 obtains adequate charging and that charging locations are not unnecessarily occupied by vehicles which do not need to obtain further power.

The examples also enable a plurality of different types of information to be accessed to ensure that the charging strategy has accurate and up to date information. This may comprise information obtained from sensors 35 on the vehicle 31 as well as information accessed from one or more servers 21. This may ensure that all vehicles 31 incorporated into the strategy receive sufficient levels of power.

The examples are also configured to take into account information which may change over time. It is to be appreciated that the charging positions for the vehicles will be different at different times of the day and the above described examples enable this to be taken into account.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed. For example in the above described examples all of the vehicles 31 are solar powered vehicles 31. It is to be appreciated that the system 41 may also be used to control the position of non-solar powered vehicles. For example if it is detected that a non-solar powered vehicle is parked in a sunny location which has high levels of incident solar power then the non-solar powered vehicle could be moved to a different location to ensure that the sunny location is available for a solar powered vehicle.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:
1. An apparatus comprising:
processing circuitry; and
memory circuitry including computer program code;
the memory circuitry and the computer program code configured to, with the processing circuitry, cause the apparatus to at least:

provide, to a remote server in a network, a current location of a solar powered vehicle and ambient light levels at the solar powered vehicle;
obtain, from the remote server and in response to the provision of the current location and the ambient light levels, solar power charging instructions for the solar powered vehicle; and
use the solar power charging instructions to enable charging of the solar powered vehicle at one or more locations in a predetermined area.

2. The apparatus of claim 1, wherein the ambient light levels are detected by an ambient light detector on the solar powered vehicle.

3. The apparatus of claim 1, wherein the apparatus is further caused to at least control, based at least in part on the solar power charging instructions, the solar powered vehicle to autonomously move the solar powered vehicle to one or more of the one or more locations to enable the charging of the solar powered vehicle.

4. The apparatus of claim 1, wherein the solar power charging instructions provide a schedule and at least a first location of the one or more locations at which the solar powered vehicle can charge.

5. The apparatus of claim 4, wherein the solar power charging instructions further comprise at least a second location of the one or more locations at which the solar powered vehicle can continue being charged.

6. A method comprising:
providing, to a remote server in a network, a current location of a solar powered vehicle and ambient light levels at the solar powered vehicle;
obtaining, from the remote server and in response to the provision of the current location and the ambient light levels, solar power charging instructions for the solar powered vehicle; and
using the solar power charging instructions to enable charging of the solar powered vehicle at one or more locations in a predetermined area.

7. The method of claim 6, wherein the ambient light levels are detected by an ambient light detector on the solar powered vehicle.

8. The method of claim 6, further comprising controlling, based at least in part on the solar power charging instructions, the solar powered vehicle to autonomously move the solar powered vehicle to one or more of the one or more locations to enable the charging of the solar powered vehicle.

9. The method of claim 6, wherein the solar power charging instructions provide a schedule and at least a first location of the one or more locations at which the solar powered vehicle can charge.

10. The method of claim 9, wherein the solar power charging instructions further comprise at least a second location of the one or more locations at which the solar powered vehicle can continue being charged.

11. An apparatus comprising:
processing circuitry; and
memory circuitry including computer program code;
the memory circuitry and the computer program code configured to, with the processing circuitry, cause the apparatus to at least:
obtain, at a server in a network from a plurality of solar powered vehicles, current locations of the plurality of the solar powered vehicles and ambient light levels at the plurality of the solar powered vehicles;
determine, at the server and based on the current locations of the plurality of the solar powered vehicles and the ambient light levels at the plurality of the solar powered vehicles, information relating to a distribution of solar power in a predetermined area;
determine, at the server and based on the distribution of the solar power in the predetermined area, solar power charging instructions; and
enable, by the server, a first of the plurality of the solar powered vehicles to access the solar power charging instructions to enable charging of the first solar powered vehicle at one or more locations in the predetermined area.

12. The apparatus of claim 11, wherein the apparatus is further caused to at least obtain, at the server, a current stored power level of the plurality of the solar powered vehicles and an expected power requirement for an expected journey of the plurality of the solar powered vehicles.

13. The apparatus of claim 11, wherein the solar power charging instructions provide a schedule and at least a first location of the one or more locations at which the first solar powered vehicle can charge.

14. The apparatus of claim 11, wherein the apparatus is further caused to at least enable, by the server, a provision of the solar power charging instructions from the first of the plurality of the solar powered vehicles to one or more others of the plurality of the solar powered vehicles.

15. The apparatus of claim 11, wherein the solar power charging instructions enable the plurality of the solar powered vehicles to coordinate their locations with respect to one another.

16. A method comprising:
obtaining, at a server in a network from a plurality of solar powered vehicles, current locations of the plurality of the solar powered vehicles and ambient light levels at the plurality of the solar powered vehicles;
determining, at the server and based on the current locations of the plurality of the solar powered vehicles and the ambient light levels at the plurality of the solar powered vehicles, information relating to a distribution of solar power in a predetermined area;
determining, at the server and based on the distribution of the solar power in the predetermined area, solar power charging instructions; and
enabling, by the server, a first of the plurality of the solar powered vehicles to access the solar power charging instructions to enable charging of the first solar powered vehicle at one or more locations in the predetermined area.

17. The method of claim 16, further comprising obtaining, at the server, a current stored power level of the plurality of the solar powered vehicles and an expected power requirement for an expected journey of the plurality of the solar powered vehicles.

18. The method of claim 16, wherein the solar power charging instructions provide a schedule and at least a first location of the one or more locations at which the first solar powered vehicle can charge.

19. The method of claim 16, further comprising enabling, by the server, a provision of the solar power charging instructions from the first of the plurality of the solar powered vehicles to one or more others of the plurality of the solar powered vehicles.

20. The method of claim 16, wherein the solar power charging instructions enable the plurality of the solar powered vehicles to coordinate their locations with respect to one another.

* * * * *